(12) United States Patent
Qiao et al.

(10) Patent No.: US 10,574,154 B1
(45) Date of Patent: Feb. 25, 2020

(54) SCALABLE UNIVERSAL SPACE VECTOR PULSE WIDTH MODULATION SCHEME FOR MULTILEVEL INVERTERS

(71) Applicant: NUtech Ventures, Lincoln, NE (US)

(72) Inventors: Wei Qiao, Lincoln, NE (US); Fa Chen, Lincoln, NE (US); Liyan Qu, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 0 days.

(21) Appl. No.: 15/694,135

(22) Filed: Sep. 1, 2017

Related U.S. Application Data

(60) Provisional application No. 62/382,504, filed on Sep. 1, 2016.

(51) Int. Cl.
| | | |
|---|---|---|
| *H02M 7/5395* | (2006.01) | |
| *H02M 1/08* | (2006.01) | |
| *H02M 1/00* | (2006.01) | |

(52) U.S. Cl.
CPC ........... *H02M 7/5395* (2013.01); *H02M 1/08* (2013.01); *H02M 2001/0054* (2013.01)

(58) Field of Classification Search
CPC ............ H02M 7/00; H02M 7/42; H02M 7/44; H02M 7/48; H02M 7/483; H02M 7/487; H02M 7/49; H02M 7/493; H02M 7/497; H02M 7/501; H02M 7/53; H02M 7/537; H02M 7/5387; H02M 7/53871; H02M 7/5388; H02M 7/53873; H02M 7/53875; H02M 7/53876; H02M 7/539; H02M 7/5395; H02M 1/08; H02M 1/081; H02M 1/082; H02M 1/084; H02M 1/0845; H02M 1/088; H02M 2001/0048; H02M 2001/0054; H02M 2001/0058; H02M 2001/0067; H02M 2001/007; H02M 2001/0074; H02M 2001/0077; H02M 2007/4822; H02M 2007/4835

USPC .... 363/15–21.03, 40–43, 65, 71, 72, 95–99, 363/123, 131–139; 323/205–211, 323/271–275, 282–285, 351

See application file for complete search history.

(56) References Cited

PUBLICATIONS

S. Wei et al., "A General Space Vector PWM Control Algorithm for Multilevel inverters", IEEE, 2003, pp. 562-568.*
J. Restrepo et al., "Parallelogram Based Method for Space Vector Pulse Width Modulation", Rev. Fac. Ing. Univ. Antioquia, Mar. 2010, No. 52, pp. 161-171. (Year: 2010).*

(Continued)

*Primary Examiner* — Gary L Laxton
*Assistant Examiner* — Carlos O Rivera-Perez
(74) *Attorney, Agent, or Firm* — Fish & Richardson P.C.

(57) ABSTRACT

A scalable universal space vector pulse-width modulation (SVPWM) scheme for multilevel inverters is disclosed. In the disclosed SVPWM scheme, the modulation triangle is quickly identified based on a coordinate transformation from an α-β coordinate system to a 120° oblique coordinate system. Then, the duty cycles and switching states of the three vertices of the modulation triangle are determined by simple algebraic computations. In a switching period, any vertex of the modulation triangle can be flexibly selected as the start point to optimize the switching sequence with flexibly adjustable duty cycle(s) for the redundant switching state(s) according to specific applications.

20 Claims, 12 Drawing Sheets

(56) References Cited

PUBLICATIONS

'www.energy.siemens.com' [online]. HVDC Plus (VSC Technology), dated Nov. 9, 2014[retrieved on Aug. 3, 2018]. Retrieved from the Internet: URL http://www.energy.siemens.com/hq/en/power-transmission/hvdc/hvdc-plus.htm. 3 pages.

Amini, "An effortless space-vector-based modulation for n-level flying capacitor multilevel inverter with capacitor voltage balancing capability," IEEE Trans. Power Electron., vol. 29, No. 11, pp. 6188-6195, Nov. 2014.

Celanovic and Boroyevich, "A fast space-vector modulation algorithm for multilevel three-phase converters," IEEE Trans. Ind. Appl., Mar./Apr. 2001, IA-37: 637-641.

Corzine et al., "Dynamic average-value modeling of a four-level drive system," IEEE Trans. Power Electron., Mar. 2003, 18: 619-627.

Deng and Chen, "Elimination of dc-link current ripple for modular multilevel converters with capacitor voltage-balancing pulse-shifted carrier PWM," IEEE Trans. Power Electron., Jan. 2015, 30: 284-296.

Deng et al., "A fast and generalized space vector modulation scheme for multilevel inverters," IEEE Trans. Power Electron., Oct. 2014, 29: 5204-5217.

Gao et al., "Control of parallel-connected modular multilevel converters," IEEE Trans. Power Electron., Jan. 2015, 30: 372-386.

Gemmell et al., "Prospects of multilevel VSC technologies for power transmission," in Proc. IEEE/PES Transmission and Distribution Conference and Exposition, Apr. 2008, pp. 1-16.

Glinka, "Prototype of multiphase modular-multilevel-converter with 2 MW power rating and 17-level-outputvoltage," in Proc. IEEE 35th Power Electron. Spec. Conf., Jun. 2004, 4: 2572-2576.

Gupta and Khambadkone, "A space vector modulation scheme to reduce common mode voltage for cascaded multilevel inverters," IEEE Trans. Power Electron., Sep. 2007, 22: 1672-1681.

Gupta and Khambadkone, "A space vector PWM scheme for multilevel inverters based on two-level space vector PWM," IEEE Trans. Ind. Electron., Oct. 2006, 53: 1631-1639.

Hagiwara and Akagi, "Control and experiment of pulse width modulated modular multilevel converters," IEEE Trans. Power Electron., Jul. 2009, 24: 1737-1746.

Kouro et al., "Recent advances and industrial applications of multilevel converters," IEEE Trans. Power Electron., Aug. 2010, 57: 2553-2580.

Krug et al., "Comparison of 2.3-kv medium-voltage multilevel converters for industrial medium-voltage drives," IEEE Trans. Ind. Electron., Dec. 2007, 54: 2979-2992.

Lai and Peng, "Multilevel converters—A new breed of power converters," IEEE Trans. Ind. Appl., May/Jun. 1996, 32: 509-517.

Liu et al., "Small-signal model-based control strategy for balancing individual DC capacitor voltages in cascade multilevel inverter-based STATCOM," IEEE Trans. Ind. Electron., Jun. 2009, 56: 2259-2269.

Loh et al., "A reduced common mode hysteresis current regulation strategy for multilevel inverters," IEEE Trans. Power Electron., Jan. 2004, 19: 192-200.

Marquardt and Lesnicar, "A new modular voltage source inverter topology," in Proc. Eur. Power Electron. Conf., Jan. 2003, 2-4.

Mei et al., "A new selective loop bias mapping phase disposition PWM with dynamic voltage balance capability for modular multi-level converter," IEEE Trans. Ind. Electron., Feb. 2014, 61: 798-807.

Meynard and Foch, "Multi-level choppers for high voltage applications," Eur. Power Electron. Drives J., Mar. 1992, 2: 41.

Mohamed et al., "A simple space vector PWM generation scheme for any general n-level inverter," IEEE Trans. Ind. Electron., May 2009, 56: 1649-1656.

Nabae et al., "A new neutral-point clamped PWM inverter," IEEE Trans. Ind. Appl., Sep./Oct. 1981, IA-17: 518-523.

Peng et al., "A power line conditioner using cascade multi-level inverters for distribution systems," IEEE Trans. Ind. Appl., Nov./Dec. 1998, 34: 1293-1298.

Pou et al., "Voltage-balance limits in four-level diode-clamped converters with passive front ends," IEEE Trans. Ind. Electron., Feb. 2005, 52: 190-196.

Pou et al., "Voltage-balancing strategies for diode-clamped multi-level converters," in Proc. IEEE 35th Annual Power Electronics Specialists Conference, Jun. 2004, 2: 3988-3993.

Rodriguez et al., "Multilevel voltage-source-converter topologies for industrial medium-voltage drives," IEEE Trans. Ind. Electron., Dec. 2007, 54: 2930-2945.

Rodriguez et al., "A survey on neutral-point-clamped inverters," IEEE Trans. Ind Electron., Jul. 2010, 57: 2219-2230.

Rodriguez et al., "Multilevel inverters: A survey of topologies, controls, and applications," IEEE Trans. Ind. Electron., Aug. 2002, 49: 724-738.

Saeedifard et al., "A space vector modulation strategy for a back-to-back five-level HVDC converter system," IEEE Trans. Ind. Electron., Feb. 2009, 56: 452-466.

Saeedifard et al., "Analysis and control of DC capacitor-voltage-drift phenomenon of a passive front-end five-level converter," IEEE Trans. Ind. Electron., Dec. 2007, 54: 3255-3266.

Saeedifard et al., "Control and dc-capacitor voltage balancing of a space vector-modulated five-level STATCOM," IET Power Electron., 2009, 2: 203-215.

Saeedifard et al., "A space vector modulated STATCOM based on a three-level neutral point clamped converter," IEEE Trans. Power Del., Apr. 2007, 22: 1029-1039.

Seo et al., "A new simplified space-vector PWM method for three-level inverters," IEEE Trans. Power Electron., Jul. 2001, 16: 545-550.

Shu et al., "Multilevel SVPWM with DC-link capacitor voltage balancing control for diode-clamped multilevel converter based STATCOM," IEEE Trans. Ind. Electron., May 2013, 60: 1884-1896.

Sinha and Lipo, "A four-level inverter based drive with a passive front end," IEEE Trans. Power Electronics, Mar. 2000, 15: 285-294.

Su et al., "A novel DC voltage balancing scheme of five-level converters based on reference-decomposition SVPWM," in Proc. 27th Annual IEEE Applied Power Electronics Conference and Exposition, Feb. 2012, 1597-1603.

Teodorescu et al., "Multilevel inverter by cascading industrial VSI," IEEE Trans. Ind. Electron., Aug. 2002, 49: 832-838.

Tolbert et al., "Multilevel converters for large electric drives," IEEE Trans. Ind. Appl., Jan./Feb. 1999, 35: 36-44.

Tolbert et al., "Multilevel PWM methods at low modulation indices," IEEE Trans. Power Electron., Jul. 2000, 15: 719-725.

Wang, "Four-level neutral point clamped converter with reduced switch count," in Proc. IEEE Power Electronics Specialists Conference, Jun. 2008, pp. 2626-2632.

Xiao et al., "Modular Cascaded H-Bridge Multilevel PV Inverter With Distributed MPPT for Grid-Connected Applications," IEEE Trans. Ind. Appl., Mar. 2015, 21: 1722-1731.

Yao et al., "Comparisons of space-vector modulation and carrier-based modulation of multilevel inverter," IEEE Trans. Power Electron., Jan. 2008, 23: 45-51.

Zhang et al., "An SVM algorithm to balance the capacitor voltages of the three-level NPC active power filter," IEEE Trans. Power Electron., Nov. 2008, 23: 2694-2702.

Zhao et al., "An improved capacitor voltage balancing method for five-level diode-clamped converters with high modulation index and high power factor," IEEE Trans. Power Electron., Apr. 2016, 31: 3189-3202.

Zhou et al., "A prototype of modular multilevel converters," IEEE Trans. Power Electron., Jul. 2014, 29: 3267-3278.

* cited by examiner

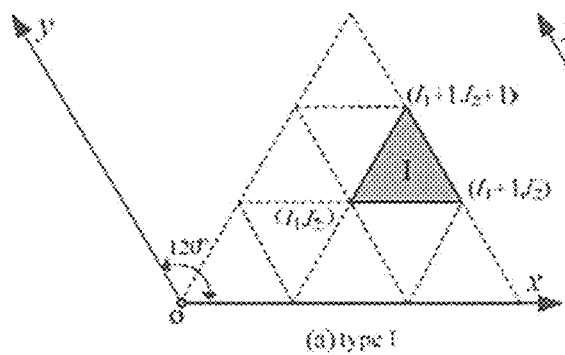 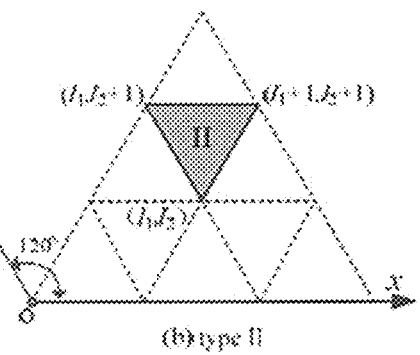
FIG. 4A  FIG. 4B
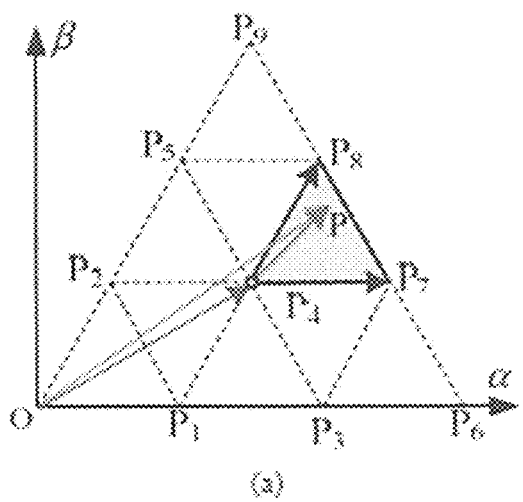 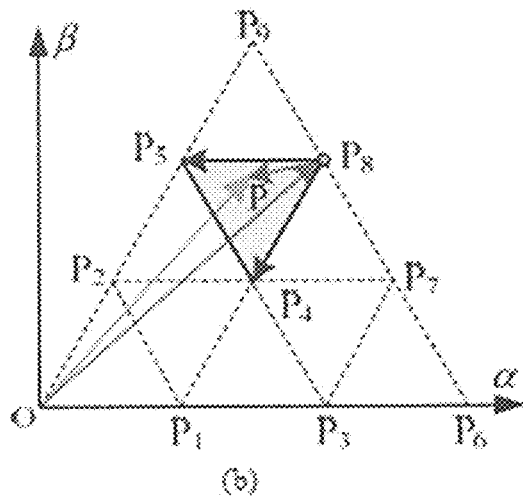
FIG. 5A  FIG. 5B

TABLE II
THE SWITCHING STATE MODIFICATIONS OF THE END VERTICES OF THE SIX UNITY VECTORS STARTING FROM A
VERTEX WITH A SWITCHING STATE OF $(S_A, S_B, S_C)$

| Unity vector | $\vec{A}$ | $-\vec{A}$ | $\vec{B}$ | $-\vec{B}$ | $\vec{C}$ | $-\vec{C}$ |
|---|---|---|---|---|---|---|
| Switching state modification of the end vertex | $S_A+1$ | $S_A-1$ | $S_B+1$ | $S_B-1$ | $S_C+1$ | $S_C-1$ |

TABLE III
SWITCHING STATE RELATIONSHIPS BETWEEN SECTOR 1 AND OTHER FIVE SECTORS

| Sector | Phase A | Phase B | Phase C |
|---|---|---|---|
| 1 | $S_A$ | $S_B$ | $S_C$ |
| 2 | $S_A - l_2$ | $S_B + l_1 - l_2$ | $S_C$ |
| 3 | $S_A - l_1$ | $S_B + l_1 - l_2$ | $S_C - l_2$ |
| 4 | $S_A - l_1$ | $S_B - l_1 - 2l_2$ | $S_C + l_1$ |
| 5 | $S_A - l_1 - l_2$ | $S_B - l_2$ | $S_C + l_1$ |
| 6 | $S_A$ | $S_B - l_2$ | $S_C + l_1 - l_2$ |

US 10,574,154 B1

SCALABLE UNIVERSAL SPACE VECTOR PULSE WIDTH MODULATION SCHEME FOR MULTILEVEL INVERTERS

CROSS-REFERENCE TO RELATED APPLICATIONS

The present application claims the benefit under 35 U.S.C. § 119(e) of U.S. Provisional Patent Application No. 62/382,504, filed Sep. 1, 2016, and titled "SCALABLE UNIVERSAL SPACE VECTOR PULSE WIDTH MODULATION SCHEME FOR MULTILEVEL INVERTERS," which is incorporated herein by reference in its entirety.

FEDERALLY SPONSORED RESEARCH OR DEVELOPMENT

This invention was made with United States Government support under Grant No. IIP1414393 awarded by the U.S. National Science Foundation. The United States Government has certain rights in this invention.

BACKGROUND

Multilevel inverters have been widely used in industrial applications due to their significant merits over the two-level inverters, such as stepped output waveforms with a lower harmonic distortion, reduced switch stress, lower instantaneous rate of voltage change dv/dt, and lower switching frequency. Various multilevel topologies, including neutral-point-clamped (NPC), flying capacitor (FC), cascaded H-bridge (CHB), and modular multilevel converter (MMC), have been proposed. Among these topologies, the emerging MMC is more promising for high-voltage/power applications due to its distinct advantages such as modularity and scalability to potentially satisfy any desired power/voltage levels.

SUMMARY

A universal space vector pulse width modulation (SVPWM) scheme is disclosed that is scalable for multilevel inverters with any voltage levels. In the disclosed SVPWM scheme, the three vertices of the modulation triangle in which the tip of the voltage reference vector is located are quickly identified based on the 120° oblique coordinates in Sector 1 transformed from the $\alpha$-$\beta$ coordinate system. Then, the duty cycles and switching states of the three vertices of the identified modulation triangle are determined utilizing algebraic computations. The switching states in other five sectors are obtained according to the relationships of the switching states between Sector 1 and the other five sectors. Such relationships are obtained by mapping the vertices in the other five sectors to the corresponding vertices in Sector 1 in the 120° coordinate system.

A method for implementing a space vector pulse width modulation scheme can include: providing a space vector mapping of switching states for a multi-level inverter, the space vector mapping having a plurality of sectors; identifying three vertices of a modulation triangle in a first sector of the space vector mapping in which a tip of a voltage reference vector is located; determining duty cycles and switching states associated with the identified three vertices of the modulation triangle; and determining switching states in other sectors of the space vector mapping according to relationships of the switching states between the first sector and the other sectors, wherein said relationships are obtained by mapping corresponding vertices in the other sectors to the identified three vertices in first sector. The method may be implemented by a controller (e.g., a processor and/or multiple processors/cores) communicatively coupled to a memory with program instructions for performing the foregoing operations. For example, the controller can be configured to control the power circuitry of a multi-level inverter based on the determined switching states for sectors defined by the power circuitry.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

FIG. 4A shows 120° coordinate relationships for three vertices of a first type (type I) of modulation triangles, in accordance with an example implementation of the present disclosure.

FIG. 4B shows 120° coordinate relationships for three vertices of a second type (type II) of modulation triangles, in accordance with an example implementation of the present disclosure.

FIG. 5A shows reference vectors in a first type (type I) of modulation triangles, in accordance with an example implementation of the present disclosure.

FIG. 5B shows reference vectors in a second type (type II) of modulation triangles, in accordance with an example implementation of the present disclosure.

DETAILED DESCRIPTION

Overview

Figure 1A:
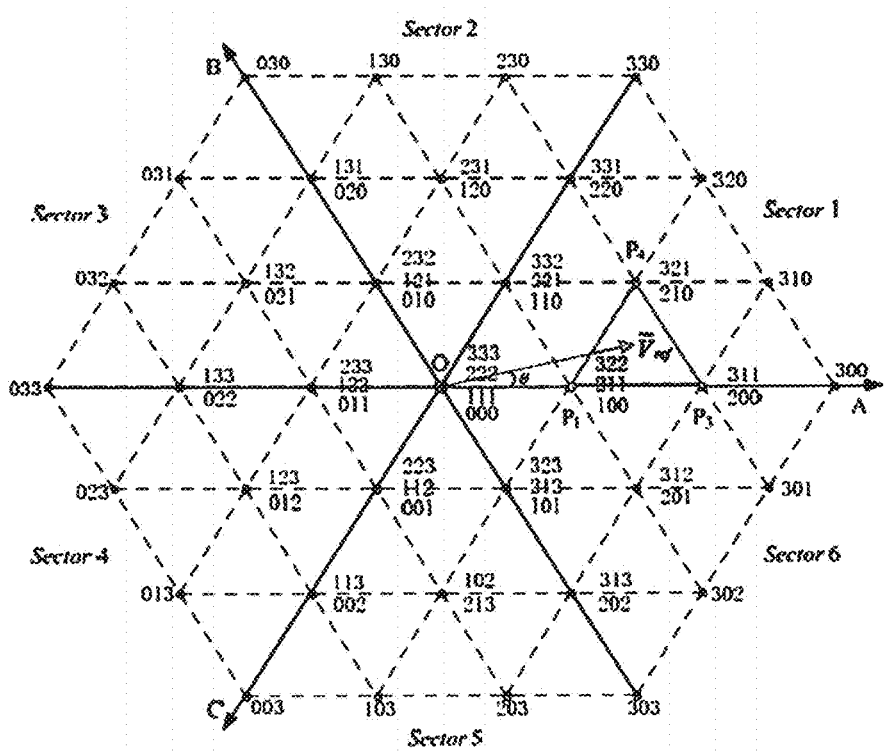
FIG. 1A is a diagrammatic view of a space vector mapping for a four-level inverter in accordance with an example implementation of the present disclosure.

Some commonly used modulation techniques designed for multilevel inverters are carrier-based pulse-width modulation (PWM) and space vector PWM (SVPWM), which is also called space vector modulation (SVM). Compared with SVPWM scheme, the carrier-based PWM scheme has several inherent drawbacks: (1) low utilization of DC bus voltage; and (2) the number of carrier signals is associated with converter configuration, normally, n−1 carrier signals are needed for an n-level inverter. Thus, the carrier signals need to be rearranged when the converter configuration varies. The requirement for a large number of carrier signals makes the carrier-based PWM scheme unsuitable for the multilevel converters with high numbers of voltage levels. The SVPWM scheme is more attractive due to its flexibility in optimizing the switching sequences and easy implementation in a digital signal processor (DSP). However, the SVPWM scheme for a multilevel inverter is complex, especially when the level number is high (e.g. as high as 264 submodules or more). There can be $6(n-1)^2$ triangles and $n^3$ switching states in the space vector diagram of a three-phase n-level inverter. The reference vector can be located within any triangle. In an SVPWM scheme, appropriate switching states of the modulation triangle need to be selected because they determine the performance of the inverter; and the duty cycle of each selected switching state needs to be calculated in real time. It is difficult for some SVPWM to meet these requirements when they are implemented in a DSP for a high-level inverter.

For example, the SVPWM method proposed in N. Celanovic and D. Boroyevich, "A fast space-vector modulation algorithm for multilevel three-phase converters," *IEEE Trans. Ind. Appl.*, vol. IA-37, no. 2, pp. 637-641, March/April 2001 detects the nearest three vectors and obtains the switching states through several matrix transformations, which require intensive computational costs for high-level inverters. An SVPWM algorithm was proposed in S. Wei, B. Wu, F. Li, and C. Liu, "A general space vector PWM control algorithm for multilevel inverters," in *Proc. 18th Annu. IEEE Applied Power Electronics Conference and Exposition*, February 2003, vol. 1, pp. 562-568 to calculate the dwelling time and switching states based on a 60° coordinate system. However, the transformation between the 60° coordinate system and the original Cartesian coordinate system can require complex trigonometric function computations. M. A. S. Aneesh, A. Gopinath, and M. R. Baiju, "A simple space vector PWM generation scheme for any general n-level inverter," *IEEE Trans. Ind. Electron.*, vol. 56, no. 5, pp. 1649-1656, May 2009 proposed an SVPWM scheme for multilevel inverters based on an iterative process to identify the sub-hexagon corresponding to a two-level SVPWM in which the tip of the reference vector is located and then determine the switching states and duty cycles of the inverters using a two-level SVPWM. Y. Deng, K. H. Teo, C. Duan, T. G. Habetler, and R. G. Harley, "A fast and generalized space vector modulation scheme for multilevel inverters," *IEEE Trans. Power Electron.*, vol. 29, no. 10, pp. 5204-5217, October 2014 presents a SVPWM scheme based on two simple mappings, which requires time-consuming iterative calculations to determine a set of nested hexagons and switching state modifications to calculate the remainder vector and the switching states. However, the computational costs and complexity of the iterative calculations in the foregoing proposed schemes increase significantly as the voltage level of the inverter increases. Therefore, these SVPWM schemes are not suitable for high-level inverters when they are implemented in a commercial DSP. The work in A. K. Gupta and A. M. Khambadkone, "A space vector PWM scheme for multilevel inverters based on two-level space vector PWM," *IEEE Trans. Ind. Electron.*, vol. 53, no. 5, pp. 1631-1639, October 2006 presents a method to quickly calculate the duty cycles for multilevel inverters. However, a prestored lookup table is needed to store the switching states offline in order to determine the switching sequences online. The memory required to store the switching states for an n-level inverter is $3n^3(n-1)/8$ bytes. For example, a 201-level inverter will need at least 609 MB memory, which is much larger than the internal memory of commonly used DSPs. And it is tedious to prestore $n^3$ switching states of the $(3n^2-3n+1)$ vertices for a three-phase inverter when the voltage level n is high (e.g., where n=201). Moreover, the switching state determination method in A. K. Gupta and A. M. Khambadkone, "A space vector PWM scheme for multilevel inverters based on two-level space vector PWM," *IEEE Trans. Ind. Electron.*, vol. 53, no. 5, pp. 1631-1639, October 2006 cannot be applied to the multilevel inverters with even levels.

A scalable, universal SVPWM scheme is disclosed for multilevel inverters with any voltage levels. FIG. 1B depicts a flowchart 150 of process for implementing a universal space vector pulse width modulation scheme for multilevel inverters in accordance with an example implementation of the present disclosure. In the disclosed SVPWM scheme, a space vector mapping of switching states for a multi-level inverter is provided (152). The three vertices of the modulation triangle in which the tip of the voltage reference vector is located are quickly identified based on the 120° oblique coordinates in Sector 1 transformed from the α-β coordinate system (154). Then, the duty cycles and switching states of the three vertices of the identified modulation triangle are determined by simple algebraic computations (156). The switching states in other five sectors are obtained according to the relationships of the switching states between Sector 1 and the other five sectors (158). Such relationships are obtained by mapping the vertices in the other five sectors to the corresponding vertices in Sector 1 in the 120° coordinate system. In a switching period, any vertex of the modulation triangle can be used as a start point to determine the switching sequence with flexibly adjustable duty cycle(s) for the redundant switching state(s), leading to a flexible optimization for the switching sequence. The disclosed SVPWM scheme can be easily implemented in a commercial low-cost DSP for inverters with any odd and even voltage levels. Moreover, the disclosed SVPWM scheme is universal and can be applied to any multilevel inverter topologies with the PWM control based on the space vector diagram. The disclosed scalable universal SVPWM scheme is capable of real-time implementation in a commonly used DSP for a multilevel inverter without the limitation on the voltage levels.

Example Implementations

Figure 13:
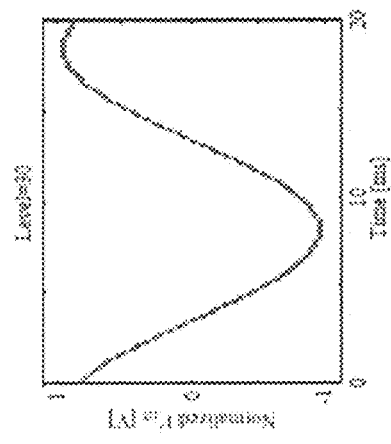
FIG. 13 shows simulated waveforms of the line voltage $V_{AB}$ of the 4-, 9-, and 30-level inverters, in accordance with an example implementation of the present disclosure.
Figure 13:
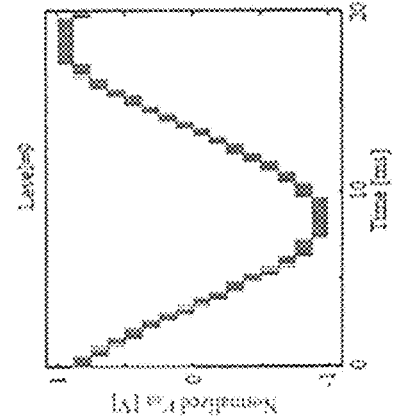
Figure 13:
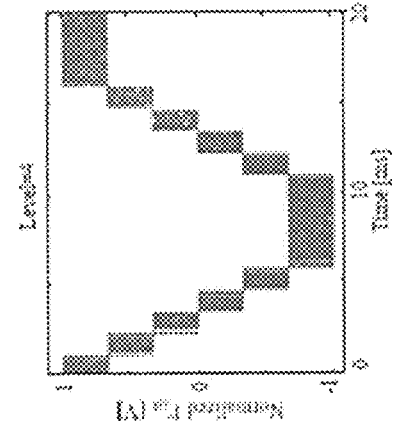
Figure 14:
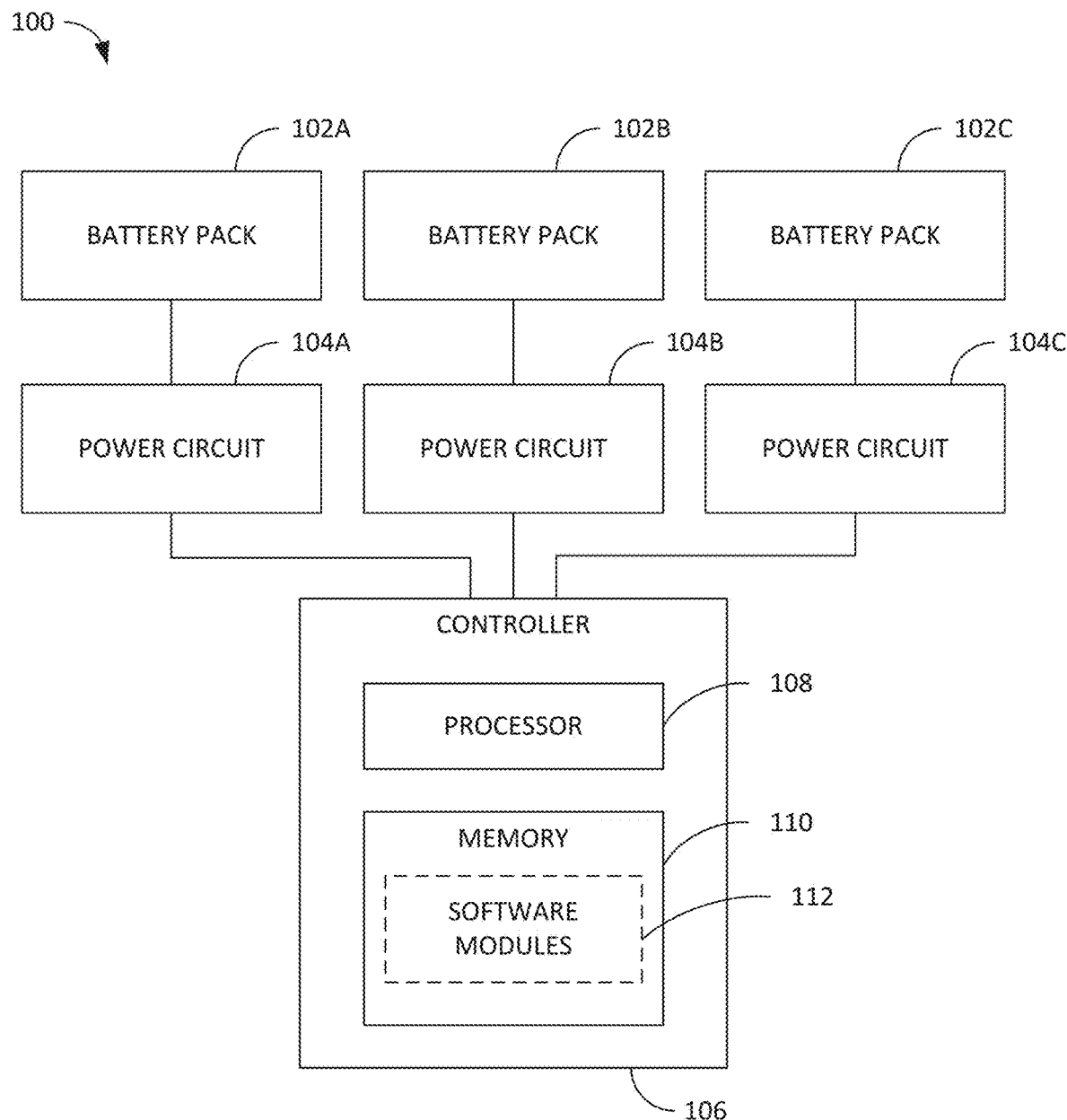
FIG. 14 shows an embodiment of a three-phase, four level inventor, in accordance with an example implementation of the present disclosure.

A scalable universal SVPWM scheme is described herein with reference to FIGS. 1A through 20. The methodology described below can be implemented by a controller 106 having at least one processor 108 (e.g., single or multiple core processor) that executes program instructions (e.g., software modules 112) from a memory 110 (e.g., a computer-readable medium, such as a storage medium (e.g., flash memory, SD card, solid-state memory device, or the like)). For example, the controller 106 can comprise a digital signal processor (DSP) coupled to a multilevel inverter 100 (e.g., as shown in FIG. 14), where the multilevel inverter 100 includes a plurality of power circuits (e.g., power circuits 104A, 104B, and 104C) coupled to respective voltage sources (e.g., battery packs 102A, 102B, and 102C). Any number of power circuits 104 (e.g., power inversion circuits) and voltage sources (e.g., battery packs 102 or other power storage/generation devices) can be used for a multilevel inverter 100, where the controller 106 is configured to determine and set the switching characteristics (e.g., switching states, switching sequences, and/or duty cycles) of the power circuitry (e.g., power circuits 104A, 104B, 104C, and so forth) according to the SVPWM scheme described herein.

For an n-level inverter, the reference vector $V_{ref}$ can be represented by $$V_{ref} = V_{dc}\left(S_A + S_B e^{j\frac{2}{3}\pi} + S_C e^{j\frac{4}{3}\pi}\right) \quad (1)$$

where $V_{dc}$ is the voltage of the DC source in each module for cascaded multilevel inverters, such as CHB, or the voltage across each capacitor connected in series between the DC terminals for non-cascaded multilevel inverters, such as NPC; $S_A$, $S_B$ and $S_C$ are the switching states of the phases A, B and C, respectively. The values of $S_A$, $S_B$ and $S_C$ vary from 0 to n−1. Then, the output voltages of the phases A, B, and C with respect to the neutral point N for cascaded multilevel inverters or the negative DC terminal for non-cascaded multilevel inverters are $S_A V_{dc}$, $S_B V_{dc}$, and $S_C V_{dc}$, respectively.

Figure 1B:
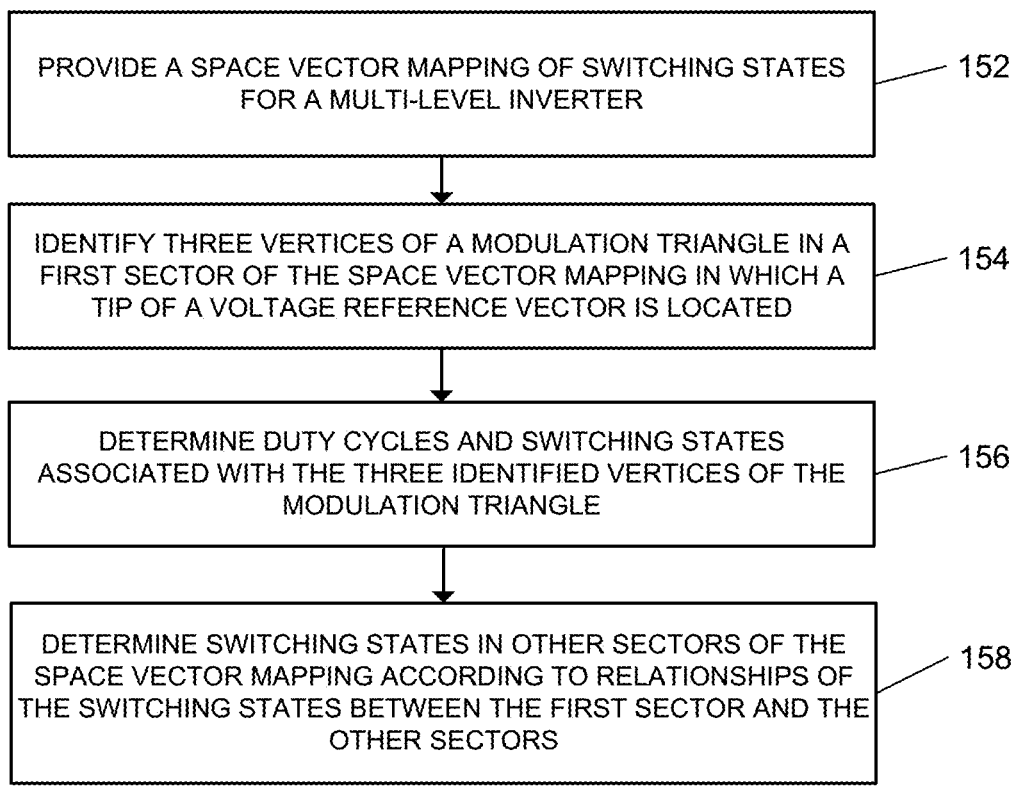
FIG. 1B depicts a flowchart of process for implementing a universal space vector pulse width modulation scheme for multilevel inverters in accordance with an example implementation of the present disclosure.

The space vector diagram based on equation (1) of a four-level inverter shown in FIG. 1A is used to illustrate the disclosed SVPWM scheme. (e.g., step 152 of FIG. 1B) In the diagram, the numbers at each vertex denote the switching state [$S_A$, $S_B$, $S_C$] of the inverter. In some vertices of the diagram, there are more than one (e.g., m) switching states, and m−1 switching states are named redundant switching states. For example, the origin O (i.e., the zero voltage vector) in the diagram has four switching states and any three of them are redundant switching states. The whole process of the disclosed SVPWM scheme is to identify the modulation triangle (e.g., $P_1P_3P_4$) which encloses the tip of the reference vector (e.g., $V_{ref}$), determine the nearest three vectors (e.g., $OP_1$, $OP_3$, and $OP_4$) based on the three vertices of the modulation triangle, calculate the duty cycles of the identified nearest three vectors to synthesize the reference vector (e.g., $V_{ref}$), and finally determine the switching states of the inverter.

A. Identification of the Modulation Triangle and Nearest Three Vectors (e.g., Step 154 of FIG. 1B)

The space vector diagram can be divided into six sectors, as shown in FIG. 1. The angle of each sector is π/3, starting from the A-axis. The length of each side of a small triangle in the diagram is assumed to be unity.

For any given reference vector with an angle θ (θ∈[0, 2π]), the sector number S (S=1, 2, . . . , 6) could be determined by $$S=\text{int}(3\theta/\pi)+1 \quad (2)$$

where int(3θ/π) means rounding down to the nearest integer of 3θ/π. The duty cycle calculations in any of the six sectors are the same. Therefore, the operation of the disclosed SVPWM scheme is analyzed in detail for the voltage reference vector in Sector 1. If a voltage reference vector locates in one of the other five sectors, its angle θ can be converted to an angle δ (δ∈[0, π/3]) in Sector 1 as follows:

$$\delta=\theta-(S-1)\pi/3 \quad (3)$$

Figure 2:
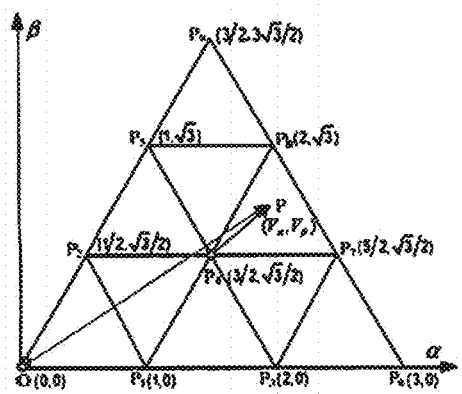
FIG. 2 shows a space vector diagram for a first sector of the space vector mapping of FIG. 1, wherein the space vector diagram for the first sector is shown in the $\alpha$-$\beta$ coordinate system, in accordance with an example implementation of the present disclosure.
Figure 3:
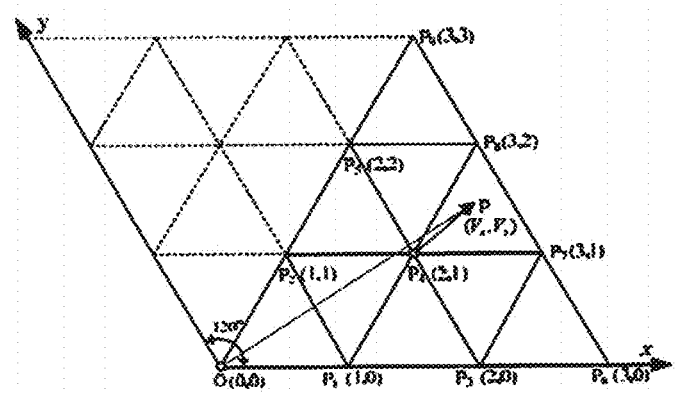
FIG. 3 shows a space vector diagram for a first sector of the space vector mapping of FIG. 1, wherein the space vector diagram for the first sector is shown in the 120° coordinate system, in accordance with an example implementation of the present disclosure.

FIGS. 2 and 3 show the space vector diagrams of Sector 1 in the α-β and 120° oblique coordinate systems, respectively. The tip P of the reference vector OP can be located in any of the nine small triangles. The α-β coordinates (Vα, Vβ) of a space vector in FIG. 2 can be transformed to the 120° oblique coordinates (Vx, Vy) of the space vector in FIG. 3 through the following equation.

$$Vx=V\alpha-V\beta \cot(2\pi/3) \text{ and } Vy=V\beta \csc(2\pi/3) \quad (4)$$

where cot and csc denote the cotangent and cosecant functions, respectively. Let $$I1=\text{int}(Vx) \text{ and } I2=\text{int}(Vy). \quad (5)$$

where I1 and I2 are the nearest rounding-down integers of Vx and Vy, respectively.

Through the coordinate transform described by equations (4) and (5), one vertex ($I_1$, $I_2$), e.g., $P_4$ (2, 1), of the modulation triangle enclosing the tip P of the reference vector OP in the α-β coordinate system of FIG. 2 is quickly identified as the base point in the 120° oblique coordinate system of FIG. 3. Then, the origin O of the reference vector OP is shifted to the identified base point, which is the center of a two-level space vector diagram, e.g., the hexagon $P_5P_8P_7P_3P_1P_2$. Therefore, the duty cycles of the nearest three vectors, i.e., the vectors from the origin O to the three vertices of the modulation triangle, can be calculated in the same way as that for the two-level SVPWM scheme. This is explained later in detail.

By connecting the identified base point and the tip of the reference vector, the remainder vector, e.g., $P_4P$, is generated, $$P_4P = OP - OP_4 \qquad (6)$$

The remainder vector is totally enclosed by the modulation triangle. After identifying the base point, additional effort is still need to determine the modulation triangle because the reference vector can locate in different small triangles having the same base point. For example, according to equations (4) and (5), two reference vectors with the respective tips at (3/2, 1) and (2, 3/2) in the α-β coordinate system have the same base point (2, 1) in the 120° coordinate system. However, the two tips locate in different small triangles $P_5P_8P_4$ and $P_8P_7P_4$, respectively. Therefore, additional effort is needed to further identify the modulation triangle (e.g., $P_5P_8P_4$ or $P_8P_7P_4$) in which the remainder vector is located.

Recall that $(V_\alpha, V_\beta)$ are the α-β coordinates of the reference vector with respect to the origin O. Let $(V_{\alpha r}, V_{\beta r})$ be the α-β coordinates of the remainder vector with respect to the shifted origin $(l_1, l_2)$. $V_{\alpha r}$ and $V_{\beta r}$ can be obtained as $$V_{\alpha r} = V_\alpha - l_1 + 0.5 l_2 \text{ and } V_{\beta r} = V_\beta - 3l_2/2 \qquad (7)$$

Then, the modulation triangle can be identified by comparing the value of $V_{\beta r}/V_{\alpha r}$ with $\sqrt{3}$ as follows.

(1) $V_{\beta r}/V_{\alpha r} \leq \sqrt{3}$: the reference vector locates in the upward triangle I, as shown in FIG. 4A, named type I modulation triangle, e.g., $P_8P_7P_4$ in FIG. 3;

(2) $V_{\beta r}/V_{\alpha r} > \sqrt{3}$: the reference vector locates in the downward triangle II, as shown in FIG. 4B, named type II modulation triangle, e.g., $P_5P_8P_4$ in FIG. 3.

After the modulation triangle is identified, the next step is to calculate the 120° coordinates of the other two vertices. For the type I modulation triangle, according to the base point $(l_1, l_2)$ in FIG. 4A, the coordinates of the other two vertices are $(l_1+1, l_2+1)$ and $(l_1+1, l_2)$, respectively. The same analysis can be applied to the type II modulation triangle. According to the base point $(l_1, l_2)$ in FIG. 4B, the coordinates of the other two vertices are $(l_1, l_2+1)$ and $(l_1+1, l_2+1)$, respectively. The three vertices of the identified modulation triangle represent the tips of the nearest three vectors of the reference vector starting from the origin O in the α-β coordinate system. The nearest three vectors will be used to synthesize the reference vector for the PWM control.

It can be seen that the process of identifying the modulation triangle and its three vertices in the 120° oblique coordinate system according to the reference vector in the a-ft coordinate system is independent of the voltage level of the multilevel inverter. Therefore, the computational cost and storage memory needed to determine the modulation triangle and its three vertices do not increase as the voltage level of the inverter increases. The next three subsections present the processes of calculating the duty cycles of the nearest three vectors and the switching states of the three vertices of the modulation triangle.

B. Calculation of the Duty Cycles for the Nearest Three Vectors

In order to synthesize the voltage reference vector using the identified nearest three vectors, the duty cycles of the nearest three vectors need to be calculated. Without loss of generality, the duty cycle calculation is presented based on the reference vector OP locating in the type I modulation triangle $P_8P_7P_4$ and the type II modulation triangle $P_5P_8P_4$, respectively. The voltage-time balance law for the reference vector OP locating in the type I modulation triangle $P_8P_7P_4$, as shown in FIG. 5A, can be described as:

$$OP \times T = (OP_4 + P_4P) \times T = OP_4 \times t_0 + OP_7 \times t_1 + OP_8 \times t_2$$
$$t_z = OP_4 \times t_0 + (OP_4 + P_4P_7) \times t_1 + (OP_4 + P_4P_8) \times t_2$$

where T is the switching period; $t_0$, $t_1$, and $t_2$ ($t_0+t_1+t_2=T$) are the duty cycles of the nearest three vectors $OP_4$, $OP_7$ and $OP_8$, respectively. Rearranging equation (8) yields $$P_4P \times T = P_4P_7 \times t_1 + P_4P_8 \times t_2 \qquad (9)$$

According to equations (8) and (9), the vectors $P_4P_4$ (i.e., the zero vector in the two-level hexagon $P_5P_8P_7P_3P_1P_2$), $P_4P_7$ and $P_4P_8$ in the type I modulation triangle $P_8P_7P_4$ are equivalent to the original nearest three vectors $OP_4$, $OP_7$ and $OP_8$ of the reference vector OP, respectively. Finally, the duty cycles of $OP_4$, $OP_7$ and $OP_8$ can be determined from equation (9) as follows.

$$\begin{cases} t_1 = (V_{\alpha r} - V_{\beta r}/\sqrt{3})T \\ t_2 = (2V_{\beta r}/\sqrt{3})T \\ t_0 = T - t_1 - t_2 \end{cases} \qquad (10)$$

The same analysis can be applied for the reference vector OP locating in the type II modulation triangle $P_5P_8P_4$, as shown in FIG. 5B. The vectors $P_8P_8$, $P_8P_5$ and $P_8P_4$ in the type II modulation triangle $P_5P_8P_4$ are equivalent to the original nearest three vectors $OP_8$, $OP_5$ and $OP_4$ of the reference vector OP, respectively. The duty cycles of $OP_8$, $OP_5$ and $OP_4$ are $t_0$, $t_1$, and $t_2$, respectively, which are calculated as $$\begin{cases} t_1 = (V_{\beta r}/\sqrt{3} - V_{\alpha r})T \\ t_2 = (1 - 2V_{\beta r}/\sqrt{3})T \\ t_0 = T - t_1 - t_2 \end{cases} \qquad (11)$$

Four switching states are selected for the three vertices of the modulation triangle in each switching period in the disclosed SVPWM scheme. Therefore, one of the three vertices will use two switching states and can be selected as the start point of the switching sequence. The duty cycles $t_{h1}$ and $t_{h2}$ (h=0, 1 or 2) of the two switching states of the start vertex can be adjusted flexibly using a normalized distribution coefficient k, given by $$t_{h1} = \frac{(1+k)}{2} t_h \text{ and } t_{h2} = \frac{(1-k)}{2} t_h, -1 \leq k \leq 1 \qquad (12)$$

The process of calculating the duty cycles of the nearest three vectors are based on the traditional two-level space vector and, therefore, is independent of the voltage level of the inverter. According to equations (10) and (11), the duty cycles only depend on the α-β coordinates $(V_{\alpha r}, V_{\beta r})$ of the remainder vector, which are calculated using equation (7).

C. Determination of Switching States and Sequence (e.g., Step 156 of FIG. 1B)

Based on the 120° coordinates of the nearest three vectors, the corresponding α-β coordinates of the three vertices of the modulation triangle can be obtained from the following equations.

$$V_\alpha = V_x - V_y/2 \text{ and } V_\beta = \sqrt{3}V_y/2 \quad (13)$$

where $(V_\alpha, V_\beta)$ and $(V_x, V_y)$ are the α-β and 120° coordinates of a nearest vector (i.e., a vertex of the modulation triangle), respectively.

Three integers are defined as follows to derive the switching states related to a specific vertex.

$$m_1 = V_\alpha + V_\beta/\sqrt{3}, m_2 = 2V_\beta/\sqrt{3}, m_3 = n - (V_\alpha + V_\beta/\sqrt{3}) \quad (14)$$

where $m_1$ and $m_2$ denote one of the switching states of the phases A and B of the inverter, respectively; and $m_3$ denotes the total number of the switching states of each phase.

For any vertex in Sector 1, the ith switching states $S_A(i)$, $S_B(i)$ and $S_C(i)$ ($i=1, \ldots, m_3$) of the phases A, B and C of an n-level inverter can be obtained by the following three equations, respectively.

$$\begin{cases} S_A(i) = m_1 + i - 1 \\ S_B(i) = m_2 + i - 1 \\ S_C(i) = i - 1 \end{cases} \quad (15)$$

For example, for the vertex $P_4$ with the 120° coordinates (2, 1) in FIG. 3, the α-β coordinates are $(3/2, \sqrt{3}/2)$ in FIG. 2, and the values of $m_1$, $m_2$, and $m_3$ are 2, 1, and 2, respectively. Thus, the switching states of the vertex $P_4$ are [2, 1, 0] and [3, 2, 1] in FIG. 1A.

According to equation (14), the number of switching states of each vertex increases as the voltage level of the inverter increases. However, in each switching period, only four switching states of the modulation triangle are required in the switching sequence in the disclosed SVPWM scheme. Therefore, only the four switching states to be used in the switching sequence need to be calculated using equations (14) and (15); all other unused switching states of each vertex of the modulation triangle do not need to be calculated. This indicates that the process of determining the switching states in each switching period is also independent of the voltage level of the inverter.

For a three-phase n-level inverter, there are $(3n^2 - 3n + 1)$ vertices and $n^3$ switching states, among which $(n-1)^3$ are redundant switching states for $(3n^2 - 9n + 7)$ vertices in the space vector diagram. In the disclosed SVPWM scheme, any of the three vertices of the modulation triangle can be flexibly chosen as the start point to optimize the switching sequence with the minimum number of switching transitions (i.e., minimum switching loss) in each switching period because all the switching states of each vertex can be obtained efficiently. Table I in FIG. 6 lists eight different switching sequences for the reference vector located in the type I modulation triangle $P_1P_4P_3$ shown in FIG. 1A with different vertices as the start points. In addition, the duty cycles for the redundant switching states are flexibly adjustable. Only one of the eight switching sequences can be used in each switching period. The selection of the appropriate switching sequence depends on the application of the inverter. For example, when a multilevel inverter is used in an energy storage system with batteries as isolated DC sources, voltage balance among different modules/cells in the battery system is an important issue. A method to balance the voltages of different battery modules/cells using the disclosed SVPWM scheme is to select appropriate redundant switching states and then determine their execution times which are flexibly adjustable during the operation. This method can be easily implemented in the disclosed SVPWM scheme. The method can also be applied to balance the capacitor voltages in the NPC and FC multilevel inverters or a multilevel inverter-based static synchronous compensator (e.g., STATCOM). In other applications, the switching sequences could be determined to reduce the common mode voltage.

D. Determination of Switching States of Vertices in Other Five Sectors (e.g., Step 158 of FIG. 1B)

Figures 6, 7:
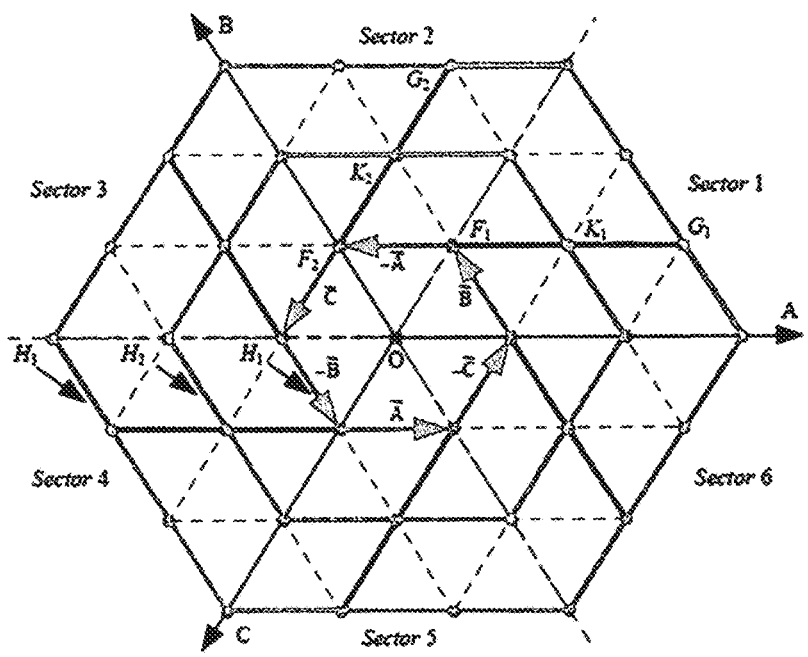
FIG. 6 shows a table of switching sequences for the reference vector located in the type I modulation triangle $P_1P_4P_3$ with different vertices as the start points, in accordance with an example implementation of the present disclosure.
FIG. 7 shows a space vector diagram for the determination of the switching states in other five sectors for a four-level inverter, in accordance with an example implementation of the present disclosure.

In the space vector diagram for a four-level inverter in FIG. 7, a unity vector is formed by connecting any two adjacent vertices; and there are six types of unity vectors, which are denoted as $\vec{A}, \vec{B}, \vec{C}, -\vec{A}, -\vec{B}$, and $-\vec{C}$, respectively. The three positive unity vectors $\vec{A}, \vec{B}$, and $\vec{C}$ are in parallel with the A-, B-, and C-axes, respectively; and the three negative unity vectors $-\vec{A}, -\vec{B}$, and $-\vec{C}$ are in anti-parallel with the A-, B-, and C-axes, respectively. If two adjacent vertices form a unity vector U ($U=\vec{A}, \vec{B}, \vec{C}, -\vec{A}, -\vec{B}$ or $-\vec{C}$) and a switching state of the start vertex of U is $[S_A, S_B, S_C]$, then the corresponding switching state of the end vertex of U is $[S_A+a, S_B+b, S_C+c]$, where $a=1$ if $U=\vec{A}$, $a=-1$ if $U=-\vec{A}$, otherwise $a=0$; $b=1$ if $U=\vec{B}$, $b=-1$ if $U=-\vec{B}$, otherwise $b=0$; and $c=1$ if $U=\vec{C}$, $c=-1$ if $U=-\vec{C}$, otherwise $c=0$. Table II in FIG. 8 lists the switching state modifications of the end vertices of the six unity vectors starting from a vertex with a switching state $[S_A, S_B, S_C]$. For example, connecting from the start vertex $F_1$ to the end vertex $F_2$ forms the unity vector $-\vec{A}$. The switching states of the vertex $F_1$ are [3, 3, 2], [2, 2, 1], and [1, 1, 0], as shown in FIG. 1A. Therefore, the corresponding switching states of the vertex $F_2$ are determined to be [2, 3, 2], [1, 2, 1], and [0, 1, 0] using $a=-1$, $b=0$, and $c=0$.

A vertex in Sector r ($r=2, 3, 4, 5, 6$) can be obtained by rotating the corresponding vertex in Sector 1 counterclockwise by $(r-1)\pi/3$ radians. For example, the vertices $F_2$, $K_2$, and $G_2$ (FIG. 7) in Sector 2 can be obtained by rotating the corresponding vertices $F_1$, $K_1$, and $G_1$ in Sector 1 counterclockwise by $\pi/3$ radians, respectively. Consider any vertex V locating in Sector r ($r=2, 3, 4, 5, 6$) and on Hexagon $H_q$ ($q=1, 2, \ldots$), where q represents the distance between the six vertices of the hexagon and the origin O. The corresponding vertex of V in Sector 1 is W, which also locates on Hexagon $H_q$. Connecting from W to V along the edges of Hexagon $H_q$ will form a route comprising $(r-1)q$ unity vectors, which include $z_{\vec{A}}$ unity vector $\vec{A}$, $z_{-\vec{A}}$ unity vector $-\vec{A}$, $z_{\vec{B}}$ unity vector $\vec{B}$, $z_{-\vec{B}}$ unity vector $-\vec{B}$, $z_{\vec{C}}$ unity vector $\vec{C}$, $z_{-\vec{C}}$ unity vector $-\vec{C}$. Therefore, $z_{\vec{A}} + z_{-\vec{A}} + z_{\vec{B}} + z_{-\vec{B}} + z_{\vec{C}} + z_{-\vec{C}} = (r-1)q$. If a switching state of the start vertex W is $[S_A, S_B, S_C]$, then the corresponding switching state of the end vertex V is $[S_A + z_{\vec{A}} - z_{-\vec{A}}, S_B + z_{\vec{B}} - z_{-\vec{B}}, S_C + z_{\vec{C}} - z_{-\vec{C}}]$.

Figures 8, 9:
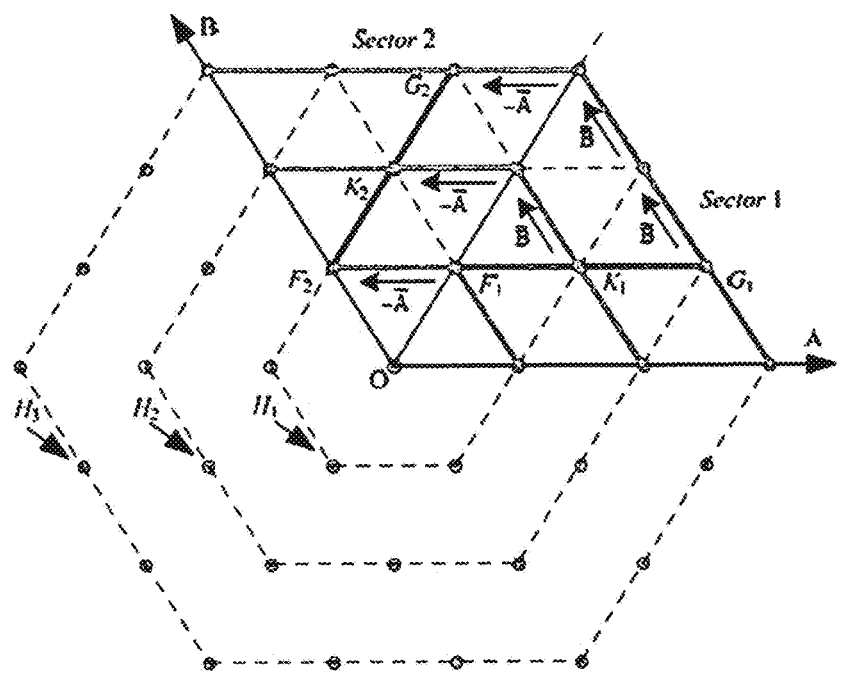
FIG. 8 shows a table of the switching state modifications of the end vertices of the six unity vectors starting from a vertex with a switching state of $[S_A, S_B, S_C]$, in accordance with an example implementation of the present disclosure.
FIG. 9 shows routes from vertices in Sector 1 to vertices in Sector 2 on the space vector diagram, in accordance with an example implementation of the present disclosure.
Figures 10, 11:
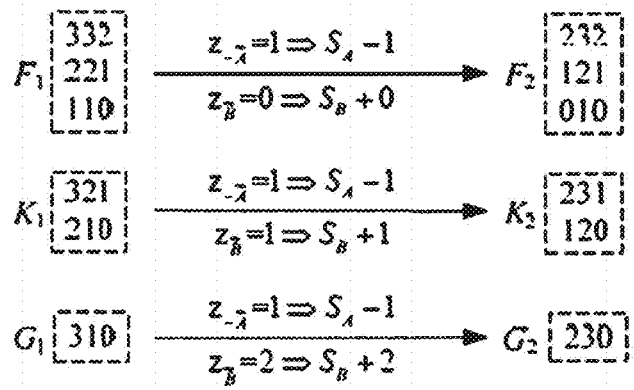
FIG. 10 shows a mapping for determination of the switching states of three vertices in Sector 2 according to their corresponding vertices in Sector 1, in accordance with an example implementation of the present disclosure.
FIG. 11 shows a table of the switching state relationships between Sector 1 and the other five sectors, in accordance with an example implementation of the present disclosure.

For example, the three different routes from the vertices $F_1$, $K_1$, and $G_1$ in Sector 1 to the vertices $F_2$, $K_2$, and $G_2$ in Sector 2, respectively, comprise 1, 2, and 3 unity vectors, respectively, because $F_j$, $K_j$, and $G_j$ ($j=1, 2$) locate on Hexagons $H_1$, $H_2$ and $H_3$, respectively. Moreover, the three routes only include of two types of unity vectors $-\vec{A}$ and $\vec{B}$, as shown in FIG. 9. The number of the unity vector $-\vec{A}$, $z_{-\vec{A}}$, in the three routes are 1, 1, and 1, respectively. The number of the unity vector $\vec{B}$, $z_{-\vec{A}}$, in the three routes are 0, 1, and 2, respectively. It can be verified that $z_{-\vec{A}}+z_{\vec{B}}=1, 2$, and 3 for the three routes, respectively. Therefore, the switching states of the vertices $F_2$, $K_2$, and $G_2$ can be obtained by the switching states of the vertices $F_1$, $K_1$, and $G_1$ and the number of the unity vectors involved in the corresponding routes, as shown in FIG. 10. The switching state $S_C$ does not change because no $\vec{C}$ or $-\vec{C}$ is involved. Note that the values of the switching states ($S_A$, $S_B$ and $S_C$) of an n-level inverter are in the range [0, n−1]. Any values beyond this range are invalid and should be discarded.

The number of each type of unity vector involved in the route is associated with the 120° coordinates ($l_1$, $l_2$) of the corresponding vertex in Sector 1 to which the vertex in other five sectors is mapped. For example, for a route connecting an end vertex in Sector 2 and the corresponding start vertex in Sector 1 that only includes the unity vectors $-\vec{A}$ and $\vec{B}$, the following general expression can be obtained to describe the relationship between the numbers of the unity vectors and the 120° coordinates ($l_1$, $l_2$) of the vertex in Sector 1.

$$\begin{cases} z_{-\vec{A}} = l_2 \\ z_{\vec{B}} = l_1 - l_2 \end{cases} \quad (16)$$

Therefore, if a switching state of the vertex in Sector 1 is [$S_A$, $S_B$, $S_C$], the corresponding switching state of the vertex in Sector 2 will be [$S_A-l_2$, $S_B+l_1-l_2$, SC]. The switching states of the vertices in other four sectors can be derived in the same way. Table III in FIG. 11 summarizes the switching state relationships between a vertex in Section I and the corresponding vertices in other five sectors. Therefore, the switching states of a vertex in any of the other five sectors can be determined by the switching states of the corresponding vertex in Sector 1 using Table III. For example, if the switching state of a vertex (3, 2) in Sector 1 is [3, 2, 0], the switching states of the corresponding vertices in other five sectors are [1, 3, 0], [0, 3, 2], [0, 1, 3], [2, 0, 3], and [3, 0, 1], respectively.

By using the disclosed method, the switching states of a vertex in any sector can be determined quickly, which removes the need for additional memory space to store and additional computational time to iteratively calculate the switching states of the vertices of the space vector diagram in some existing SVPWM schemes. Moreover, the calculation process is independent of the voltage level of the inverter. Therefore, both the computational cost and memory requirement of the disclosed method are independent of the voltage level of the inverter.

Figure 12:
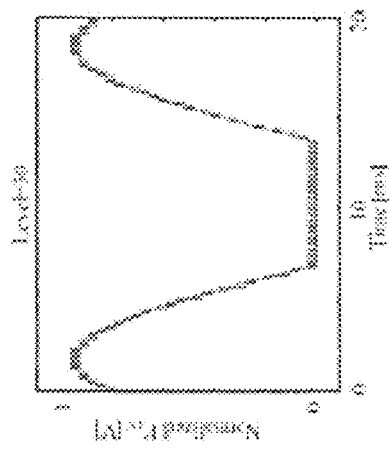
FIG. 12 shows simulated waveforms of the phase voltage $V_{AN}$ of the 4-, 9-, and 30-level inverters, in accordance with an example implementation of the present disclosure.
Figure 12:
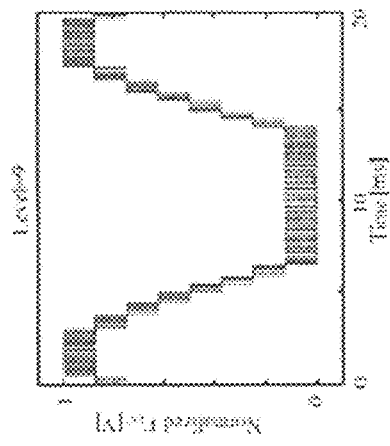
Figure 12:
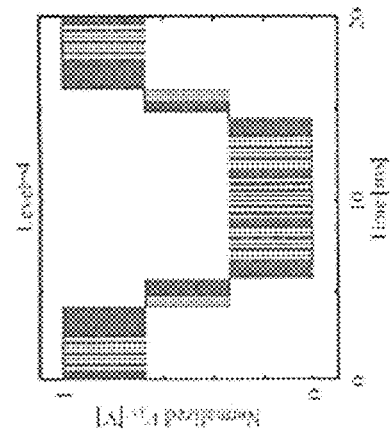

Simulation studies were carried out in MATLAB/Simulink to validate the disclosed SVPWM scheme, where the switching frequency, base frequency, and modulation index are 5 kHz, 50 Hz, and 0.95, respectively. In the disclosed SVPWM scheme, four switching states are used in the switching sequence of each switching period, and the two switching states used for the same vertex of the modulation triangle are assigned with equal duty cycles, namely, $t_{h1}=t_{h2}=0.5t_h$ (i.e., k=0 in equation (12)). The simulation studies were performed for inverters with even (i.e., 4 and 30) and odd (i.e., 9) voltage levels. The waveforms of the output phase voltage $V_{AN}$ in one line cycle of the 4-, 9-, and 30-level inverters are shown in FIG. 12. FIG. 13 shows the waveforms of the output line voltage $V_{AB}$ in one line cycle for the 4-, 9-, and 30-level inverters. The phase voltage $V_{AN}$ is a stepped waveform. The output line voltage waveform gets closer to a sinusoidal wave with a lower total harmonic distortion (THD) as the level increases. For example, the line voltage of the 30-level inverter is more sinusoidal than that of the 4-level inverter.

Figure 20:
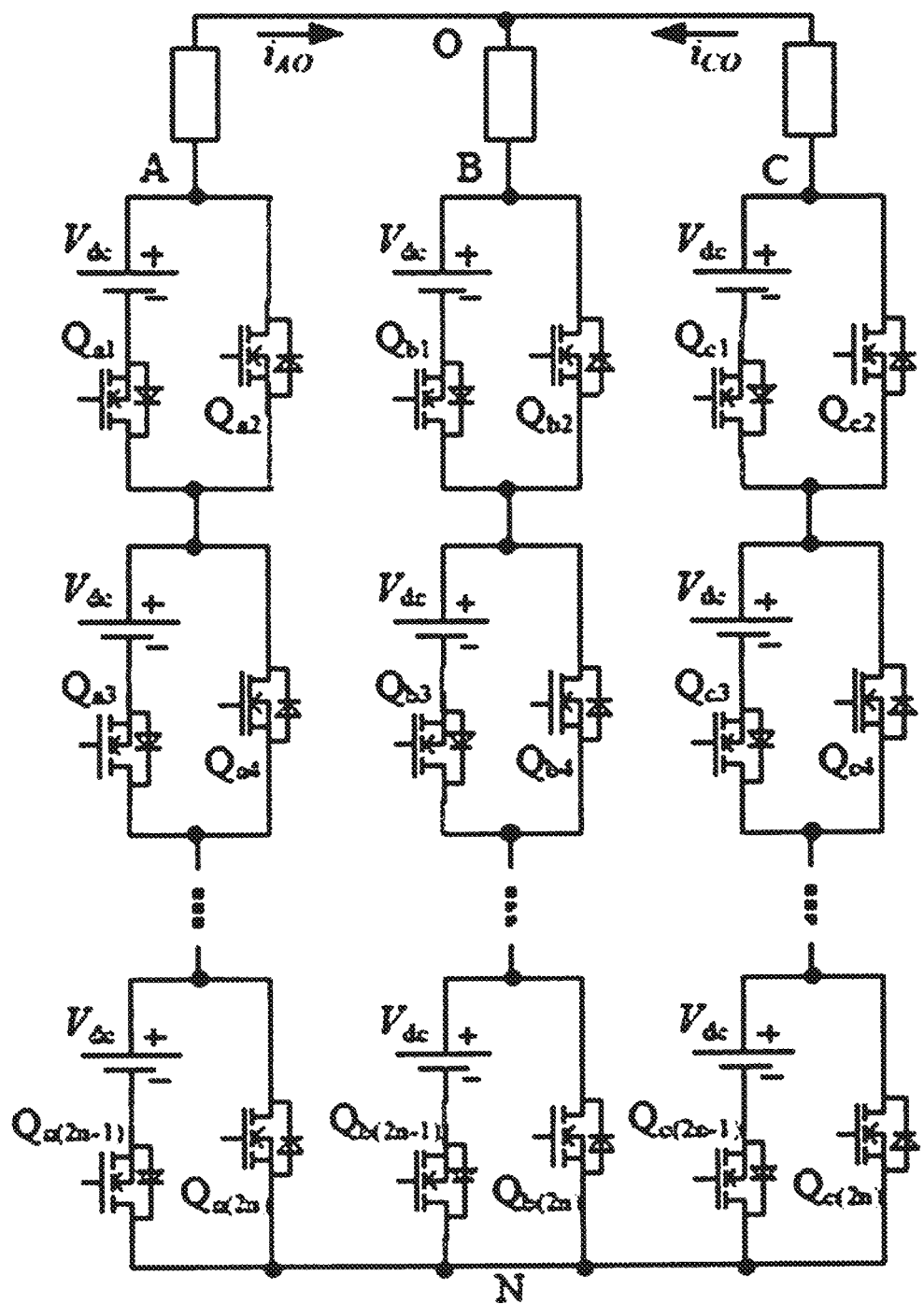
FIG. 20 shows topology of a three-phase symmetrical cascaded half-bridge multilevel inverter with a star connection, in accordance with an example implementation of the present disclosure.

FIG. 14 shows a three-phase, four-level inverter 100 implemented using the three-phase symmetrical cascaded half-bridge topology shown in FIG. 20. FIG. 20 shows the topology of the three-phase symmetrical cascaded half-bridge multilevel inverter with a star connection. Each phase comprises multiple identical basic half-bridge modules connected in series. Each half-bridge module is formed by an independent DC voltage source and two switching devices. The phase voltage between the terminal of each phase, A, B, or C, and the neural point N, is equal to the sum of the voltages generated by all the modules in the phase.

The inverter 100 in FIG. 14 includes three identical half-bridge modules cascaded per phase, where each of the half-bridge modules includes a power inversion circuit (e.g., power circuit 104A, 104B, or 104C) and a respective voltage source (e.g., battery pack 102A, 102B, or 102C) coupled to the power inversion circuit. In some embodiments, star-connected, three-phase, inductive-resistive load with a 1.5-mH inductance and a 5-Ω resistance per phase is connected with the inverter 100. In some embodiments, the switching frequency, fundamental frequency, and modulation index may be the same as those utilized in the simulation discussed above. In some embodiments, a battery pack (e.g., battery pack 102A, 102B, or 102C) includes six lithium-ion cells (e.g., Samsung ICR18650-28A) connected in parallel with the nominal voltage of 3.75 V used as the DC voltage source in each half-bridge module. The power inversion circuits (e.g., power circuit 104A, 104B, and 104C) are coupled to a controller 106 (e.g., a DSP) or any other controller including at least one single or multiple core processor 108 configured to perform a SVPWM scheme, as described above. For example, program instructions (e.g., software modules 112) can include instruction sets that, when executed by the controller 106 from a memory 110 (e.g., a memory of the controller 106 and/or a communicatively coupled memory), cause the controller 106/processor 108 to perform the computations described above with regard to the SVPWM scheme disclosed herein. In some embodiments, the controller 106 includes a DSP (e.g., TMS320F28335 DSP).

In embodiments, the controller 106 is configured to a controller configured to control duty cycles and switching states of the multi-level inverter 100. For example, the controller 106 can be configured to: generate a space vector mapping of switching states for the multi-level inverter, where the space vector mapping includes a plurality of sectors. (e.g., step 152 of FIG. 1B) The controller 106 can be configured to identify three vertices of a modulation triangle in a first sector of the space vector mapping in which a tip of a voltage reference vector is located. (e.g., step 154 of FIG. 1B) The controller 106 is then configured to determine duty cycles and switching states associated with the identified three vertices of the modulation triangle. (e.g., step 156 of FIG. 1B) In some embodiments, the controller 106 is configured to determine the duty cycles associated with the identified three vertices of the modulation triangle at least in part by: determining three vectors having endpoints at respective ones of the three vertices of the modulation triangle; and calculating the duty cycles of the three vectors. For example, the controller 106 can be configured to calculate the duty cycle of at least one of the three vectors for two switching states ($t_{h1}$ and $t_{h2}$) based on the following equations:

$$t_{h1} = \frac{(1+k)}{2}t_h \text{ and } t_{h2} = \frac{(1-k)}{2}t_h, -1 \le k \le 1,$$

where h=0, 1, or 2. The controller 106 can also be configured to calculate the ith switching states ($S_A(i)$, $S_B(i)$, and $S_C(i)$) for respective phases (A, B, and C) of a vertex of the three vertices of the modulation triangle according to the following:

$$\begin{cases} S_A(i) = m_1 + i - 1 \\ S_B(i) = m_2 + i - 1 \\ S_C(i) = i - 1 \end{cases}$$

where $m_1 = V_\alpha + V_\beta/\sqrt{3}$ and $m_2 = 2V_\beta/\sqrt{3}$, and where ($V_\alpha$, $V_\beta$) are α-β coordinates of the vertex. The controller 106 can also be configured to calculate the ith switching states ($S_A(i)$, $S_B(i)$, and $S_C(i)$) for i=1 to i=$m_3$, where $m_3$ is the total number of switching states for each phase. As discussed above, $m_3 = n - (V_\alpha + V_\beta/\sqrt{3})$, where n is a number of levels for the multi-level inverter. The controller 106 is configured to determine switching states in other sectors of the space vector mapping according to relationships of the switching states between the first sector and the other sectors, wherein said relationships are obtained by mapping corresponding vertices in the other sectors to the identified three vertices in first sector. (e.g., step 158 of FIG. 1B) The foregoing implementations are provided as non-limiting examples of the controller 106 configuration, and it is to be understood that the controller 106 can additionally or alternatively be configured to perform any of the computations described herein with reference to FIGS. 1 through 13.

Figure 15:
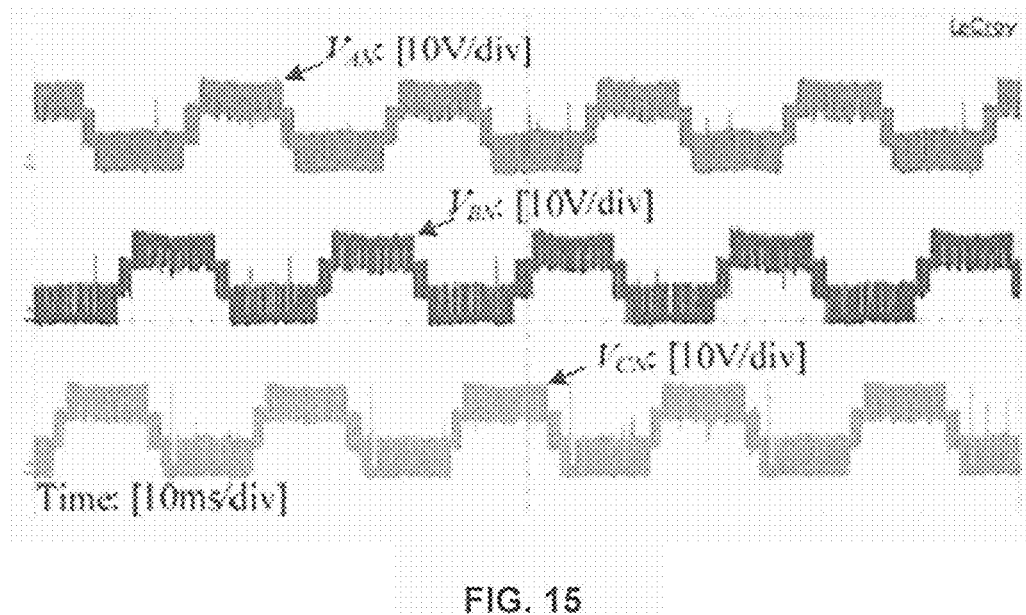
FIG. 15 shows measured three-phase voltages $V_{AN}$, $V_{BN}$, and $V_{CN}$ of the three-phase, four-level inverter of FIG. 14.
Figure 16:
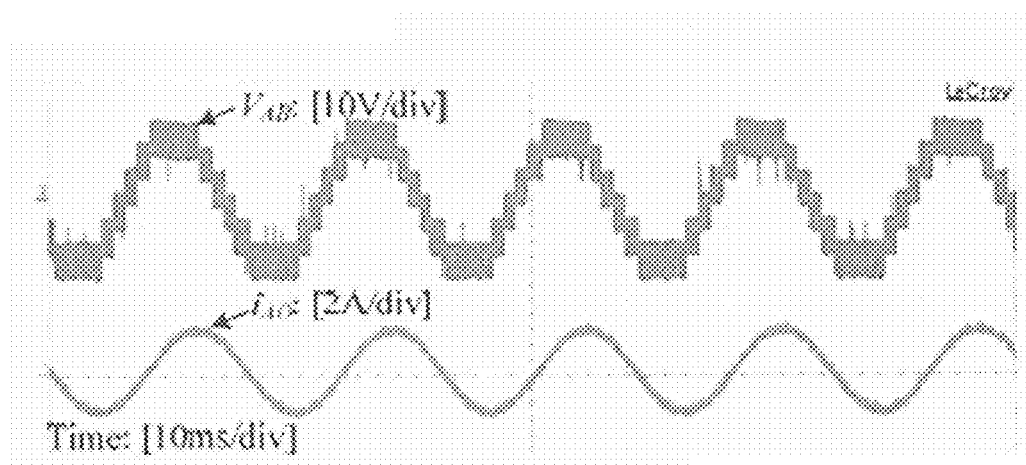
FIG. 16 shows measured line voltage $V_{AB}$ and phase A current $i_{AO}$ of the three-phase, four-level inverter of FIG. 14.
Figure 17:
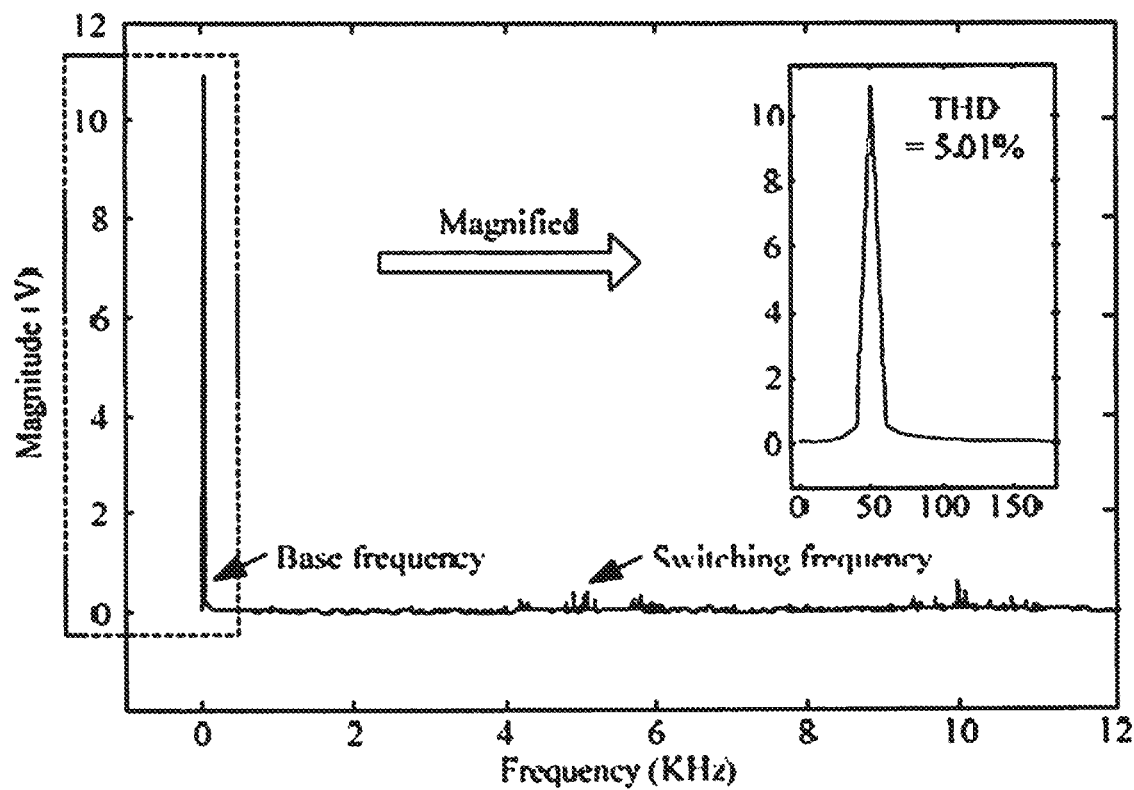
FIG. 17 shows a Fast Fourier Transform (FFT) harmonic spectrum of the line voltage $V_{AB}$, in accordance with an example implementation of the present disclosure.

FIG. 15 shows the waveforms of the three-phase voltages $V_{AN}$, $V_{BN}$, and $V_{CN}$. The phase voltages are staircase waveforms with four levels, which are consistent with the simulation results. FIG. 16 shows the seven-level line voltage $V_{AB}$ and the phase current $i_{AO}$ through the load. The peak value of the line voltage $V_{AB}$ is about 11 V. The load phase current $i_{AO}$ is nearly sinusoidal. The peak value of the load phase current is approximately 1.1 A. FIG. 17 shows the fast Fourier transform (FFT) harmonic spectrum of the line voltage $V_{AB}$ in the frequency range $0 \le f \le 12$ kHz. Only high-frequency switching harmonics exist and their magnitudes are close to zero. The THD of $V_{AB}$ calculated using the 2nd to the 100th harmonics is only 5.01%.

Figure 18:
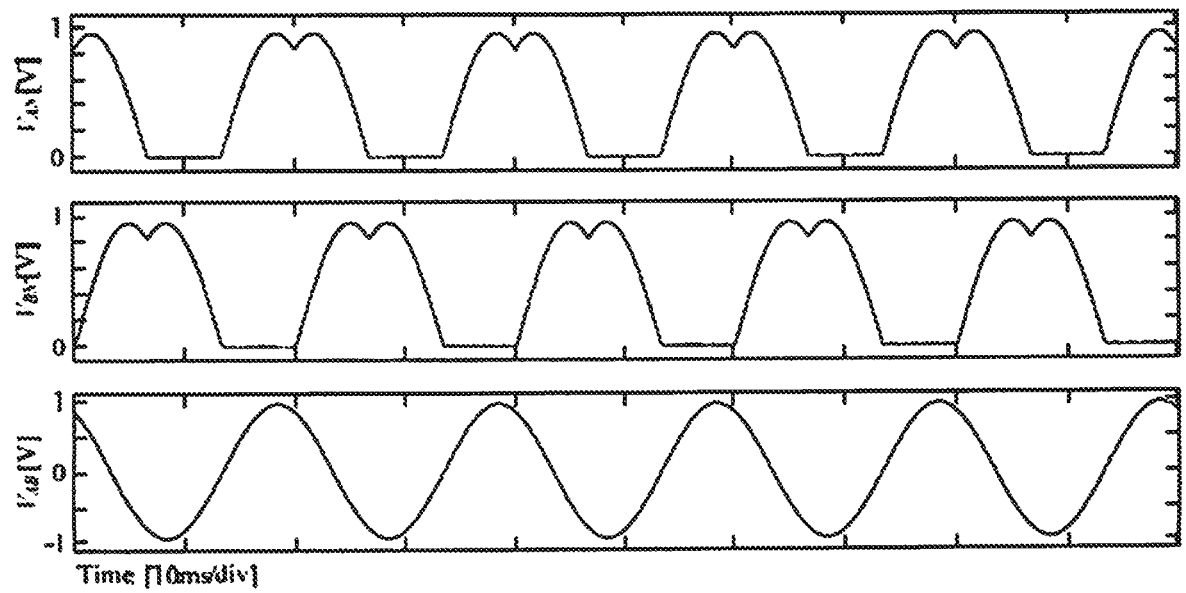
FIG. 18 shows simulated waveforms of a 201-level inverter: phase voltages $V_{AN}$ and $V_{BN}$ and line voltage $V_{AB}$, in accordance with an example implementation of the present disclosure.
Figure 19:
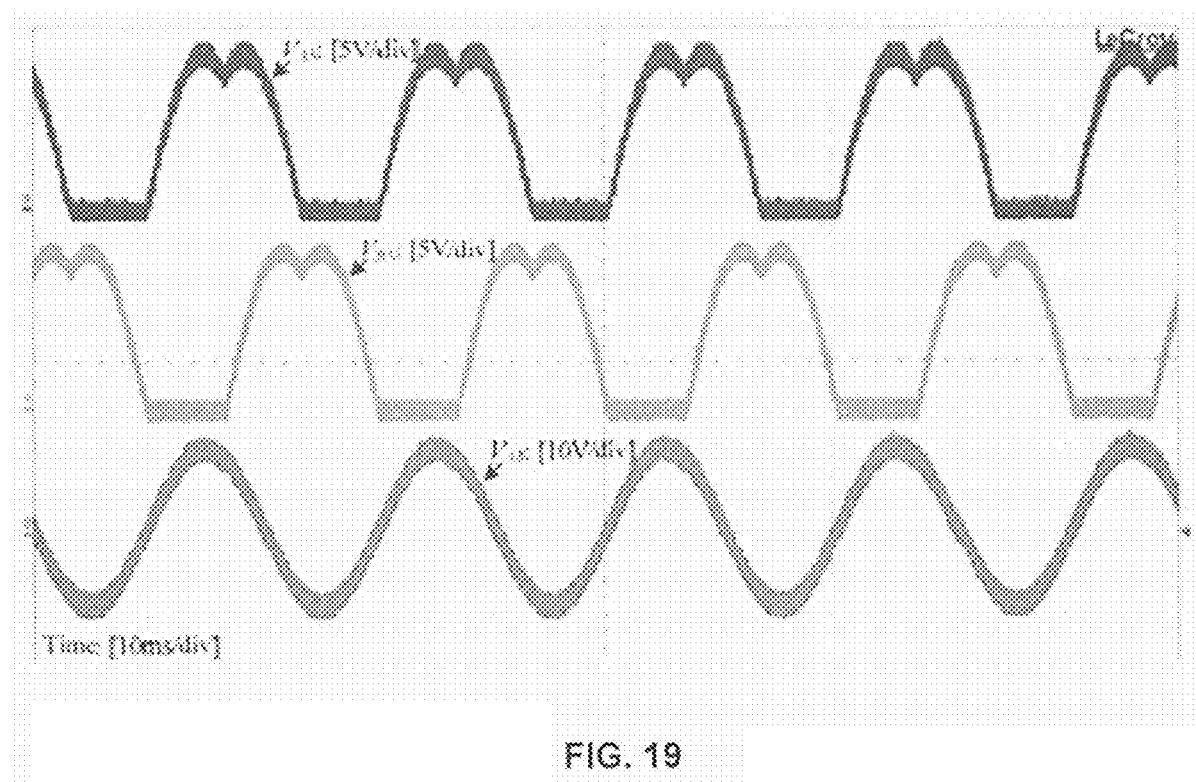
FIG. 19 shows experimental waveforms of a 201-level inverter obtained from a digital signal processor (DSP) and digital-to-analog converter (DAC): phase voltages $V_{AN}$ and $V_{BN}$ and line voltage $V_{AB}$, in accordance with an example implementation of the present disclosure.

To verify the scalability of the disclosed SVPWM scheme, an experiment was carried out to implement the disclosed SVPWM scheme in a TMS320F28335 DSP for a 201-level inverter, where a digital to analog converter (DAC) AD5725 was used to generate the inverter waveforms. FIG. 18 shows the waveforms of the phase voltages $V_{AN}$ and $V_{BN}$ and line voltage $V_{AB}$ of the 201-level inverter simulated in MATLAB/Simulink at the same aforementioned operating condition. FIG. 19 shows the experimental waveforms of the phase voltages $V_{AN}$ and $V_{BN}$ and line voltage $V_{AB}$ of the 201-level inverter obtained from the DSP and DAC, which agree well with the simulated waveforms in FIG. 18. These results verify the scalability of the disclosed SVPWM scheme for real-time implementation in a commercial low-cost DSP for inverters with high voltage levels. The line voltage is a smooth sinusoidal waveform with a nearly zero THD without using any filter.

As explained above, the whole process of the disclosed SVPWM scheme, including the identification of the modulation triangle, calculation of the duty cycles of the three vertices of the modulation triangle, and determination of the switching states, is independent of the voltage level of the inverter, only requires simple algebraic calculations, and does not require a lookup table to store or a time-consuming iterative operation to calculate the switching states and the corresponding duty cycles. Therefore, the computational cost and memory requirement of the disclosed SVPWM scheme do not increase as the inverter level increases, which enables the disclosed SVPWM scheme to be implemented in a low-cost DSP (e.g., TMS320F28335) to control an inverter with any voltage level, such as a voltage level much higher than 201.

A scalable universal SVPWM scheme for multilevel inverters with any odd or even levels has been described herein with reference to various example implementations. Compared with the existing SVPWM schemes, the disclosed SVPWM scheme has the following advantages. First, the modulation triangle where the reference vector is located is quickly identified based on a coordinate transformation from the α-β coordinate system to the 120° coordinate system. Then, the duty cycles and switching states of the nearest three vectors (i.e., the three vertices of the modulation triangle) are determined by simple algebraic computations based on the identified modulation triangle. Second, the computational cost and storage memory of the disclosed SVPWM scheme does not increase as the inverter level increases. Therefore, the disclosed SVPWM scheme is scalable for real-time implementation in a commercial low-cost DSP for inverters with any voltage levels. Third, the disclosed SVPWM scheme is computationally efficient because no memory-consuming pre-stored lookup table or time-consuming iterative computation is required to determine the duty cycles and switching states. Moreover, in a switching period, any vertex of the modulation triangle could be flexibly selected as the start point to optimize the switching sequence with flexibly adjustable duty cycle(s) for the redundant switching state(s) according to specific requirements. Finally, the disclosed SVPWM scheme is universal and can be applied to any multilevel inverters (e.g., the NPC, FC, CHB, and MMC topologies) as long as their PWM controls are based on the space vector diagram. The duty cycle computations and switching state selections are the same for different topologies. The only difference is that the allocations of the gate signals of the power switches of different topologies are different.

Simulation and experimental results have validated the effectiveness and scalability of the disclosed SVPWM scheme. In particular, the disclosed SVPWM scheme has been successfully implemented in a TMS320F28335 DSP for a three-phase, 201-level inverter.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A method for implementing a space vector pulse width modulation scheme, comprising: providing a space vector mapping of switching states for a multi-level inverter, the space vector mapping having six sectors; identifying three vertices of a modulation triangle in a first sector of the space vector mapping in which a tip of a voltage reference vector is located, wherein identifying the three vertices of the modulation triangle comprises: transforming Cartesian coordinates of the voltage reference vector into 120° oblique coordinates, identifying, from 120° oblique coordinates of the voltage reference vector, a first one of the three vertices of the modulation triangle, and identifying a second and a third of the three vertices of the modulation triangle based on a coordinates of a remainder vector determined from shifting an origin of the voltage reference vector to the first one of the three vertices, wherein the remainder vector is enclosed within the three vertices of the modulation triangle; determining duty cycles and switching states associated with the identified three vertices of the modulation triangle; and determining switching states in five other sectors of the space vector mapping according to relationships of the switching states between the first sector and the five other sectors, wherein said relationships are obtained by mapping corresponding vertices in the five other sectors to the identified three vertices in first sector.

2. The method of claim 1, wherein determining the duty cycles associated with the identified three vertices of the modulation triangle includes:
determining three vectors having endpoints at respective ones of the three vertices of the modulation triangle; and
calculating the duty cycles of the three vectors.

3. The method of claim 2, wherein the duty cycle of at least one of the three vectors is calculated for two switching states ($t_{h1}$ and $t_{h2}$) according to the following:

$$t_{h1} = \frac{(1+k)}{2}t_h \text{ and } t_{h2} = \frac{(1-k)}{2}t_h, -1 \leq k \leq 1,$$

where h=0, 1, or 2 and indicates an identity of the at least one of the three vectors.

4. The method of claim 1, wherein the switching states associated with the identified three vertices of the modulation triangle comprise switching states that correspond to three phases (A, B, and C) of the multi-level inverter.

5. The method of claim 4, wherein the ith switching states ($S_A(i)$, $S_B(i)$, and $S_C(i)$) for the respective phases (A, B, and C) of a vertex of the three vertices of the modulation triangle are calculated according to the following:

$$\begin{cases} S_A(i) = m_1 + i - 1 \\ S_B(i) = m_2 + i - 1 \\ S_B(i) = i - 1 \end{cases},$$

Where $m_1=V_\alpha+V_\beta/\sqrt{3}$ and $m_2=2V_\beta/\sqrt{3}$, and where ($V_\alpha$, $V_\beta$) are α-β coordinates of the vertex.

6. The method of claim 5, wherein the ith switching states ($S_A(i)$, $S_B(i)$, and $S_C(i)$) are calculated for i=1 to i=$m_3$, where $m_3$ is the total number of switching states for each phase.

7. The method of claim 6, wherein $m_3$=n−($V_\alpha$ +$V_\beta/\sqrt{3}$), where n is a number of levels for the multi-level inverter.

8. A method for implementing a space vector pulse width modulation scheme, comprising: providing a space vector mapping of switching states for a multi-level inverter, the space vector mapping having a plurality of sectors; identifying three vertices of a modulation triangle in a first sector of the space vector mapping in which a tip of a voltage reference vector is located, wherein identifying the three vertices of the modulation triangle comprises: transforming Cartesian coordinates of the voltage reference vector into 120° oblique coordinates, identifying, from 120° oblique coordinates of the voltage reference vector, a first one of the three vertices of the modulation triangle, and identifying a second and a third of the three vertices of the modulation triangle based on a coordinates of a remainder vector determined from shifting an origin of the voltage reference vector to the first one of the three vertices, wherein the remainder vector is enclosed within the three vertices of the modulation triangle; determining duty cycles and switching states associated with the identified three vertices of the modulation triangle; and determining switching states in other sectors of the space vector mapping according to relationships of the switching states between the first sector and the other sectors, wherein said relationships are obtained by mapping corresponding vertices in the other sectors to the identified three vertices in first sector.

9. The method of claim 8, wherein determining the duty cycles associated with the identified three vertices of the modulation triangle includes:
determining three vectors having endpoints at respective ones of the three vertices of the modulation triangle; and
calculating the duty cycles of the three vectors.

10. The method of claim 9, wherein the duty cycle of at least one of the three vectors is calculated for two switching states ($t_{h1}$ and $t_{h2}$) according to the following:

$$t_{h1} = \frac{(1+k)}{2}t_h \text{ and } t_{h2} = \frac{(1-k)}{2}t_h, -1 \leq k \leq 1,$$

where h=0, 1, or 2 and indicates an identity of the at least one of the three vectors.

11. The method of claim 8, wherein the switching states associated with the identified three vertices of the modulation triangle comprise switching states that correspond to three phases (A, B, and C) of the multi-level inverter.

12. The method of claim 11, wherein the ith switching states ($S_A(i)$, $S_B(i)$, and $S_C(i)$) for the respective phases (A, B, and C) of a vertex of the three vertices of the modulation triangle are calculated according to the following:

$$\begin{cases} S_A(i) = m_1 + i - 1 \\ S_B(i) = m_2 + i - 1 \\ S_B(i) = i - 1 \end{cases},$$

Where $m_1=V_\alpha+V_\beta/\sqrt{3}$ and $m_2=2V_\beta/\sqrt{3}$, and where ($V_\alpha$, $V_\beta$) are α-β coordinates of the vertex.

13. The method of claim 12, wherein the ith switching states ($S_A(i)$, $S_B(i)$, and $S_C(i)$) are calculated for i=1 to i=$m_3$, where $m_3$ is the total number of switching states for each phase.

14. The method of claim 13, wherein $m_3$=n−($V_\alpha$+$V_\beta/\sqrt{3}$), where n is a number of levels for the multi-level inverter.

15. A system for implementing a space vector pulse width modulation scheme, comprising: a multi-level inverter; and a controller configured to control duty cycles and switching states of the multi-level inverter, the controller configured to: generate a space vector mapping of switching states for the multi-level inverter, the space vector mapping having a plurality of sectors; identify three vertices of a modulation triangle in a first sector of the space vector mapping in which a tip of a voltage reference vector is located, wherein identifying the three vertices of the modulation triangle comprises: transforming Cartesian coordinates of the voltage reference vector into 120° oblique coordinates, identifying, from 120° oblique coordinates of the voltage reference vector, a first one of the three vertices of the modulation triangle, and identifying a second and a third of the three vertices of the modulation triangle based on a coordinates of a remainder vector determined from shifting an origin of the voltage reference vector to the first one of the three vertices, wherein the remainder vector is enclosed within the three vertices of the modulation triangle; determine duty cycles and switching states associated with the identified three vertices of the modulation triangle; and determine switching states in other sectors of the space vector mapping according to relationships of the switching states between the first sector and the other sectors, wherein said relationships are obtained by mapping corresponding vertices in the other sectors to the identified three vertices in first sector.

16. The system of claim 15, wherein the controller is configured to determine the duty cycles associated with the identified three vertices of the modulation triangle at least in part by:

determining three vectors having endpoints at respective ones of the three vertices of the modulation triangle; and calculating the duty cycles of the three vectors.

17. The system of claim 16, wherein the controller is configured to calculate the duty cycle of at least one of the three vectors for two switching states ($t_{h1}$ and $t_{h2}$) according to the following:

$$t_{h1} = \frac{(1+k)}{2} t_h \text{ and } t_{h2} = \frac{(1-k)}{2} t_h, -1 \leq k \leq 1,$$

where h=0, 1, or 2 and indicates an identity of the at least one of the three vectors.

18. The system of claim 15, wherein the controller is configured to calculate the ith switching states ($S_A(i)$, $S_B(i)$, and $S_C(i)$) for respective phases (A, B, and C) of a vertex of the three vertices of the modulation triangle according to the following:

$$\begin{cases} S_A(i) = m_1 + i - 1 \\ S_B(i) = m_2 + i - 1 \\ S_B(i) = i - 1 \end{cases},$$

where $m_1 = V_\alpha + V_\beta/\sqrt{3}$ and $m_2 = 2V_\beta/\sqrt{3}$, and where ($V_\alpha$, $V_\beta$) are α-β coordinates of the vertex.

19. The system of claim 18, wherein the controller is configured to calculate the ith switching states ($S_A(i)$, $S_B(i)$, and $S_C(i)$) for i=1 to i=$m_3$, where $m_3$ is the total number of switching states for each phase.

20. The system of claim 19, wherein $m_3 = n - (V_\alpha + V_\beta/\sqrt{3})$, where n is a number of levels for the multi-level inverter.

* * * * *